June 12, 1945.  F. C. REGGIO  2,378,037
ENGINE REGULATING MEANS
Filed Feb. 21, 1944  3 Sheets-Sheet 2

Inventor
F. C. Reggio

June 12, 1945.    F. C. REGGIO    2,378,037
ENGINE REGULATING MEANS
Filed Feb. 21, 1944    3 Sheets-Sheet 3

Inventor
F. C. Reggio

Patented June 12, 1945

2,378,037

UNITED STATES PATENT OFFICE 2,378,037

ENGINE REGULATING MEANS

Ferdinando Carlo Reggio, Buffalo, N. Y.

Application February 21, 1944, Serial No. 523,192

35 Claims. (Cl. 123—117)

This invention relates generally to engine regulating devices and particularly to ignition timing regulating devices and fuel-air ratio regulating devices automatically actuated in dependance upon one or more operative conditions. Insofar as the subject matter is common, this application is a continuation in part of my copending patent application Serial Number 401,353, filed July 7, 1941, entitled Fuel metering device.

The spark timing requirements of internal combustion engines greatly vary with changes of operative conditions such as engine speed, manifold air pressure or density, engine operative temperature, exhaust pressure, exhaust temperature, engine mean effective pressure, engine fuel-air mixture ratio. Accordingly, one of the objects of the invention is to provide a device for automatically controlling the ignition timing in dependance upon one or more of these operative conditions in order to obtain as nearly as possible the ideal spark timing which corresponds, among other things, to maximum power and minimum fuel consumption.

Another object is to provide a device for varying the ignition timing as a preselected function of two or more independent variables, the latter being related to engine operative conditions.

A further object is to provide a device for varying the engine fuel-air ratio automatically in response to changes of one or more engine operative conditions.

A still further object is to provide common means for regulating the engine fuel-air ratio and the ignition timing.

The above and other objects will be apparent as the description proceeds; and while I have illustrated and described by way of example the preferred embodiments of the invention as they now appear to me, it will be understood that such changes may be made as fall within the scope of the appended claims. In the description and in the claims various details will be identified by specific names for convenience, but they are intended to be as generic in the application as the art will permit.

Figure 1:
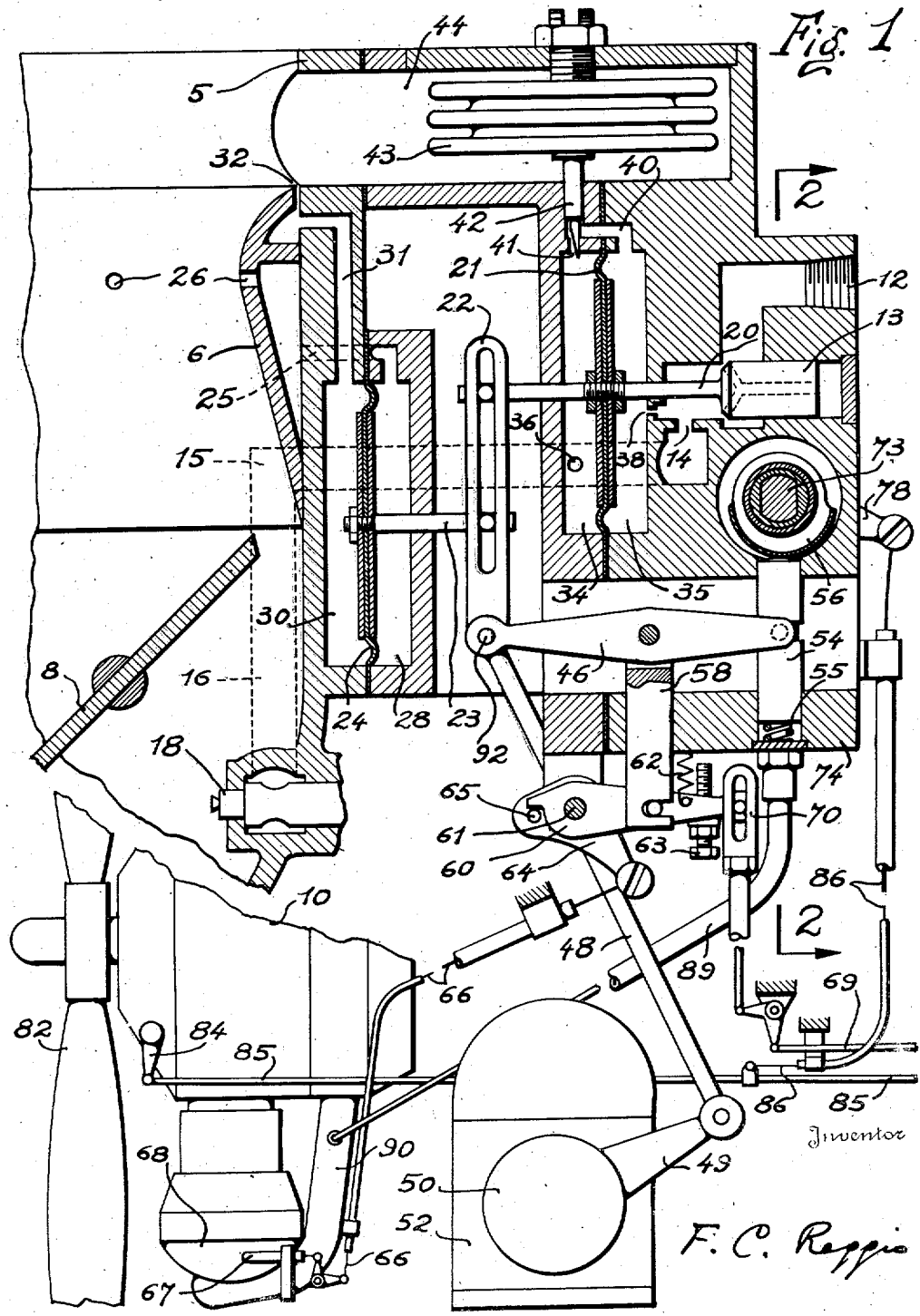
Figure 1 is a sectional view of one of the preferred embodiments of the invention, diagrammatically showing the operative connections between engine and ignition timer.

The ignition timing and fuel-air ratio control device is shown in Figure 1 in connection with a carburetor having a barrel 5 and a venturi 6 therein. A throttle valve 8 is provided between the venturi and the engine 10. The latter is diagrammatically represented in the drawings as a conventional supercharged radial air-cooled aircraft engine, but may of course be any other suitable type of internal combustion engine.

Liquid fuel under pressure is led to the inlet port 12 of the carburetor and flows through a first orifice controlled by a slidable valve 13, through a second calibrated orifice 14 and ducts 15 and 16 to an injection nozzle valve 18 which discharges the liquid fuel into the air inlet pipe downstream of the throttle valve 8. The valve 13 which controls the engine fuel supply is connected by means of a rod 20 with a first diaphragm 21, and by means of a lever 22 and rod 23 with a second diaphragm 24. Through conduits 25, 26 the chamber 28 on one side of the latter diaphragm is connected with the throat of the venturi, while the chamber 30 on the opposite side of the diaphragm is connected by means of a duct 31 and an annular passage 32 with the carburetor barrel upstream of the venturi. It is clear that the diaphragm 24 is responsive to the venturi differential pressure and in turn to the engine air supply, the arrangement being such that when this differential pressure increases the diaphragm moves toward the right to open the valve 13 and increase the engine fuel supply.

Chambers 34 and 35 on opposite sides of diaphragm 21 are connected with the fuel conduit downstream and upstream of the calibrated orifice 14 by means of a duct 36 and of a calibrated orifice 38, respectively. These chambers are directly connected with one another by way of a conduit 40 provided with an orifice 41 controlled by a slidable needle valve 42 actuated by a bellows or capsule 43 containing air or gas. This bellows is enclosed in a housing 44 connected with the carburetor barrel by means of a short and wide conduit 45 whereby the bellows is surrounded by air having substantially the same pressure and temperature as the air in the carburetor barrel; the result being that the effective area of the orifice 41 is dependent upon the air density in the carburetor.

The lever 22 has an elongated slot engaged by pins provided on rods 20 and 23. The lower end of this lever is rotatably connected with one end of a floating lever 46, and with one end of a rod 48 the opposite end of which is connected with a lever 49 secured to the contact breaker 50 of the engine magneto 52. The opposite end of the floating lever 46 is connected with a slidable cam follower 54 which is kept by means of a spring 55 in contact with a cam 56, while at an intermediate point thereof the lever 46 is rotatably mounted on a pin secured to a slidable rod 58. The rod 58 is in turn actuated by a lever 60 rotatably mounted on a pin 61 carried by the carburetor housing. A tension spring 62 tends to rotate the lever 60 counter-clockwise Rotation of the latter in said direction is limited by an adjustable screw 63. A second lever 64, also rotatably mounted on the pin 61, is provided with a peg 65 adapted to engage a radial extension formed in lever 60 so as to rotate the latter clockwise against the load exerted thereon by the spring 62.

The lever 64 may be actuated by means of a flexible wire connection 66 from a temperature responsive element 67 which is preferably mounted on or near the engine cylinder head 68, so as to be responsive to an engine operative temperature such as the temperature of the cylinder head, or of any suitable part attached thereon or connected therewith, or to the temperature of the cooling medium, the arrangement being such that as the temperature to which the element 67 is subject increases beyond a certain value, it determines clockwise rotation of levers 64 and 60. The latter lever may also be actuated by means of a remote manual linkage 69 through a pin and elongated slot connection 70.

The cam 56, as shown in the drawings, includes a stamped piece made of thin steel sheet, surface-hardened and secured to a splined hub 71 provided with an annular groove 72 and slidable on a splined shaft 73 rotatably supported on one side by the housing 74 which is a part of the carburetor body, and on the opposite side by the cover 75. A spacing tube 76 and a retaining end washer 77 secure the necessary rigidity to the cam. A lever 78 secured to one end of shaft 73, and a lever 80 pivoted to the housing 74 and engaging the groove 72 serve to control the angular and axial adjustments of the cam 56, respectively.

Figure 2:
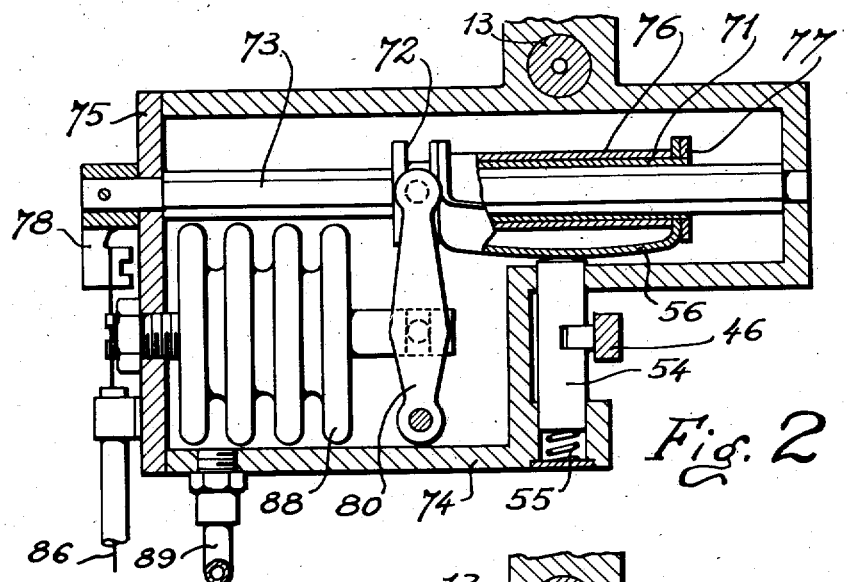
Figure 2 is a section along the line 2—2 of Figure 1.

In the example of embodiment of the invention which is illustrated in Figures 1 and 2 the aircraft engine 10 drives a variable-pitch propeller 82. An engine-driven governor, not shown in the drawings, adjusts the pitch of the propeller so as to maintain the engine speed at a value determined by the adjustment of the governor control lever 84, which lever may be actuated by the pilot or engineer by way of a rod or linkage 85. This arrangement is well known in the art and it is therefore regarded as unnecessary to describe it in further detail. A flexible wire 86 connects the lever 78 with the rod 85. The lever 80 is actuated by a sealed, resilient bellows 88 enclosed in the air-tight housing 74 which is connected by way of pipe 89 with the engine induction manifold 90 connecting the supercharger with the cylinder 68. The angular and axial adjustments of the cam 56 are thus dependent upon engine speed and manifold pressure.

The carburetor operates as follows: The air pressure load on the diaphragm 24 is proportional to the differential pressure determined by the venturi 6. This load is transmitted through lever 22 to the control valve 13 and tends to open the latter and increase the engine fuel supply. This load is resisted by the diaphragm 21 which is subject to a fuel pressure load proportional to the differential pressure determined by the flow of fluel through the calibrated orifice 14. Under steady operation these opposite loads applied to the valve rod 20 are in equilibrium. If the engine air supply increases, as when the throttle valve 8 is opened, the air pressure load on diaphragm 24 increases and causes displacement of the valve 13 to the right so as to increase the engine fuel supply. As a result the fuel pressure load on diaphragm 21 also increases so as to restrain the displacement of the valve 13 toward the right; whereupon the valve 13 attains a new position of equilibrium corresponding to an increase of engine fuel supply which is proportional to the increase of air flow through the venturi. Conversely, if the mass of air flowing through the venturi decreases, the valve 13 is displaced to the left to proportionally decrease the engine fuel supply.

The chamber 34 is connected with the fuel conduit 15 by means of a duct 36 of comparatively large size, and the pressure in said chamber is therefore substantially the same as on the downstream side of the orifice 14. As stated above, the fuel pressure load on diaphragm 21 is proportional to the difference of pressure between upstream and downstream sides of the orifice 14. The ratio of proportionality therebetween, however, is dependent upon the adjustment of the needle valve 42 and in turn upon the air density in the carburetor barrel. At high altitude the bellows 43 is distended, the orifice 41 is almost completely closed, and the pressure in chamber 35 is substantially the same as the pressure above the orifice 14. At sea level, however, with bellows 43 contracted and the orifice 41 fully open, the fuel pressure in chamber 35 is appreciably lower that the pressure on the upstream side of the orifice 14. With a properly designed profile of the needle valve 42 it is possible fully to compensate the carburetor in such manner as to render the fuel-air ratio independent of changes of altitude, by correcting the tendency of the conventional carburetors, determined by the peculiar air metering characteristic of the venturi, of supplying richer mixture at high altitude. A more complete and detailed description of this carburetor may be found in my copending patent application above referred to.

It is thus apparent that with the carburetor shown in Figure 1 the fuel-air ratio is independent of changes of engine air supply and of variations of air density. This ratio may be decreased or increased, respectively, by upwardly or downwardly displacing the pin 92 upon which the lever 22 is rotatably mounted. The pin 92 is also connected by means of the linkage 48 with the contact breaker 50 of the magneto 52. The spark is advanced or retarded by rotating the circuit breaker 50 counter-clockwise or clockwise, respectively. Since the adjustment of lever 46 as shown in the device of Figures 1 and 2 is dependent upon the angular and axial adjustments of the warped cam 56, it follows that the engine ignition timing and the fuel-air ratio are automatically regulated as a certain function of engine speed and manifold pressure, said function being determined by the configuration of the cam. In general, the optimum values of ignition timing and fuel-air ratio corresponding to each combination of speed and manifold pressure will be determined by the engine manufacturer for each type of engine, representing the best compromise between power output, fuel economy, operating temperatures, etc., while the manufacturers of ignition and fuel metering equipment may determine the configuration of the corresponding cam 56.

The adjustment of the floating lever 46 may further be altered through levers 64 and 60 by means of the temperature responsive element 67. Accordingly, the spark timing is automatically retarded and the mixture is enriched when the operative temperature to which the element 67 is subject attains a comparatively high value, brought about for example by protracted operation of the engine at high power output, or by a long climb of the aircraft during which the engine cooling is poor. Furthermore the spark timing and the mixture ratio may be manually regulated by means of the remote control linkage 69.

It is to be clearly understood that the present invention is not limited to a device according to Figures 1 and 2 for automatically controlling the spark timing and/or the mixture ratio as a function of engine speed, manifold pressure and engine temperature. According to the invention, condition-controlling means other than the engine speed control members 85, 84 and/or condition responsive means other than the induction pressure sensitive bellows 88 and the temperature responsive element 67 may be operatively connected with levers 78, 80 and 64, as it will be appreciated that the optimum combination of engine operative conditions upon which the ignition timing and/or the mixture ratio should be dependent may not be the same for engines of different type, having different operative characteristics or employed under different conditions.

Figure 3:
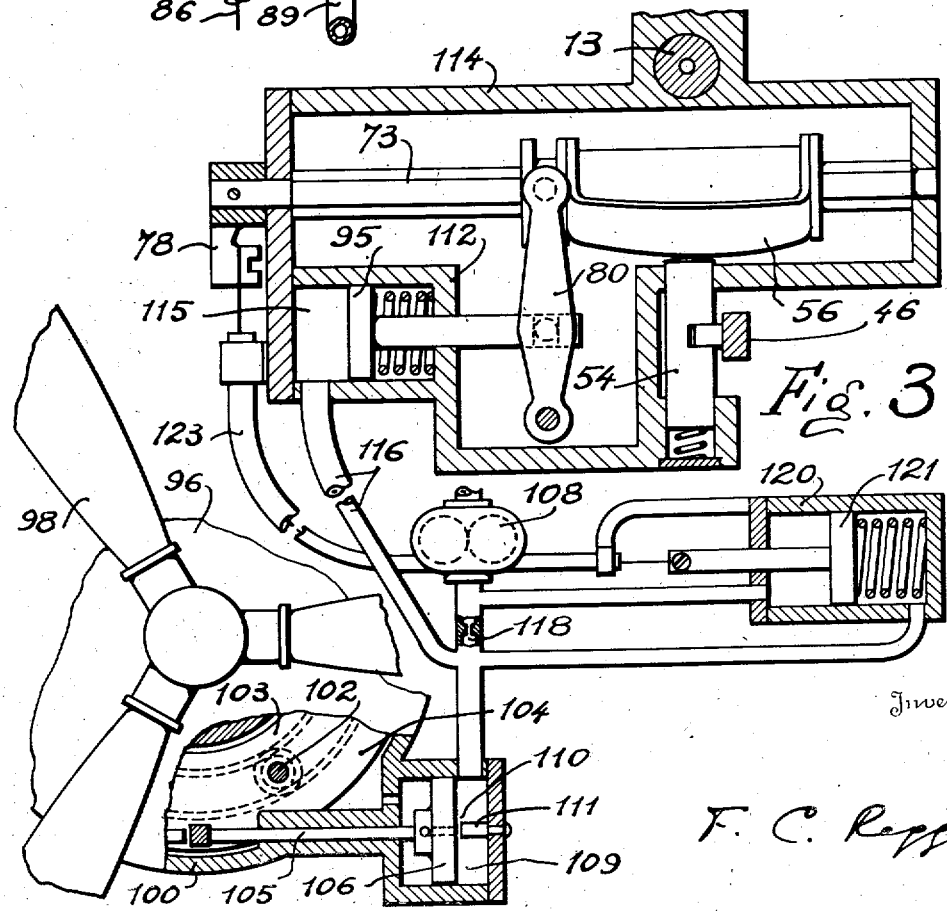
Figure 3 is a sectional view illustrating a partially modified embodiment of the invention.

Figure 3 shows a partially modified embodiment of the invention, wherein the lever 80 which controls the axial adjustment of the cam 56 is actuated by a piston 95 responsive to the torque transmitted by the aircraft engine 96 to the propeller 98; and since engine torque and engine mean brake effective pressure are proportional, the torque responsive device of Figure 3 is also responsive to variations of mean brake effective pressure. In the diagrammatic section in reduced scale through the engine nose perpendicular to the crankshaft, 100 is the housing of the planetary reduction gear having planet pinions supported by journals 102 carried by an annular member, not shown, rotatable with the shaft of propeller 98 and engaged between a sun gear 103 secured to the engine crankshaft and an outer ring gear 104. The latter is kept from rotating by means of an axial extension 105 of a pressure loaded piston 106 for providing a hydraulic torque meter, this being a known device. An engine-driven pump 108 discharges oil under pressure into a chamber 109 on one side of the piston 106 for acting against the tangential load, proportional to the propeller torque, transmitted thereto by the outer ring gear 104. Oil escapes from chamber 109 by way of a restriction 110, the effective area of which is dependent on the distance between the piston 106 and a pin 111 carried by the cylinder cover. The piston 106 is normally in equilibrium between the opposite loads transmitted thereto by the ring gear 104 and the oil pressure in chamber 109. An increase of torque causes a displacement of piston 106 toward the right thereby reducing the open area of orifice 110 and increasing the oil pressure in chamber 109 until the equilibrium of piston 106 is resumed.

A cylinder 112 including the resiliency loaded piston 95 connected with lever 80 is provided in the cam housing 114. The cylinder chamber 115 on one side of piston 95 communicates by way of pipe 116 with chamber 109, whereby the axial adjustment of cam 56 is determined by the propeller torque, as stated above. The oil delivered by the volumetric engine-driven pump 108, which is proportional to the engine speed, before reaching the cylinder 109 is forced through a small orifice 118, preferably of the thin edge type which is characterized by the fact that the pressure drop caused by the flow of fluid therethrough is not appreciably affected by changes of viscosity. A cylinder 120, including a resiliently loaded piston 121 is connected at opposite sides of said piston with the oil duct upstream and downstream of the orifice 118, respectively, so that the adjustment of said piston and in turn the angular adjustments of lever 78, which is connected therewith by way of a flexible wire 123, and that of the cam 56 are dependent upon the engine speed.

Figure 4:
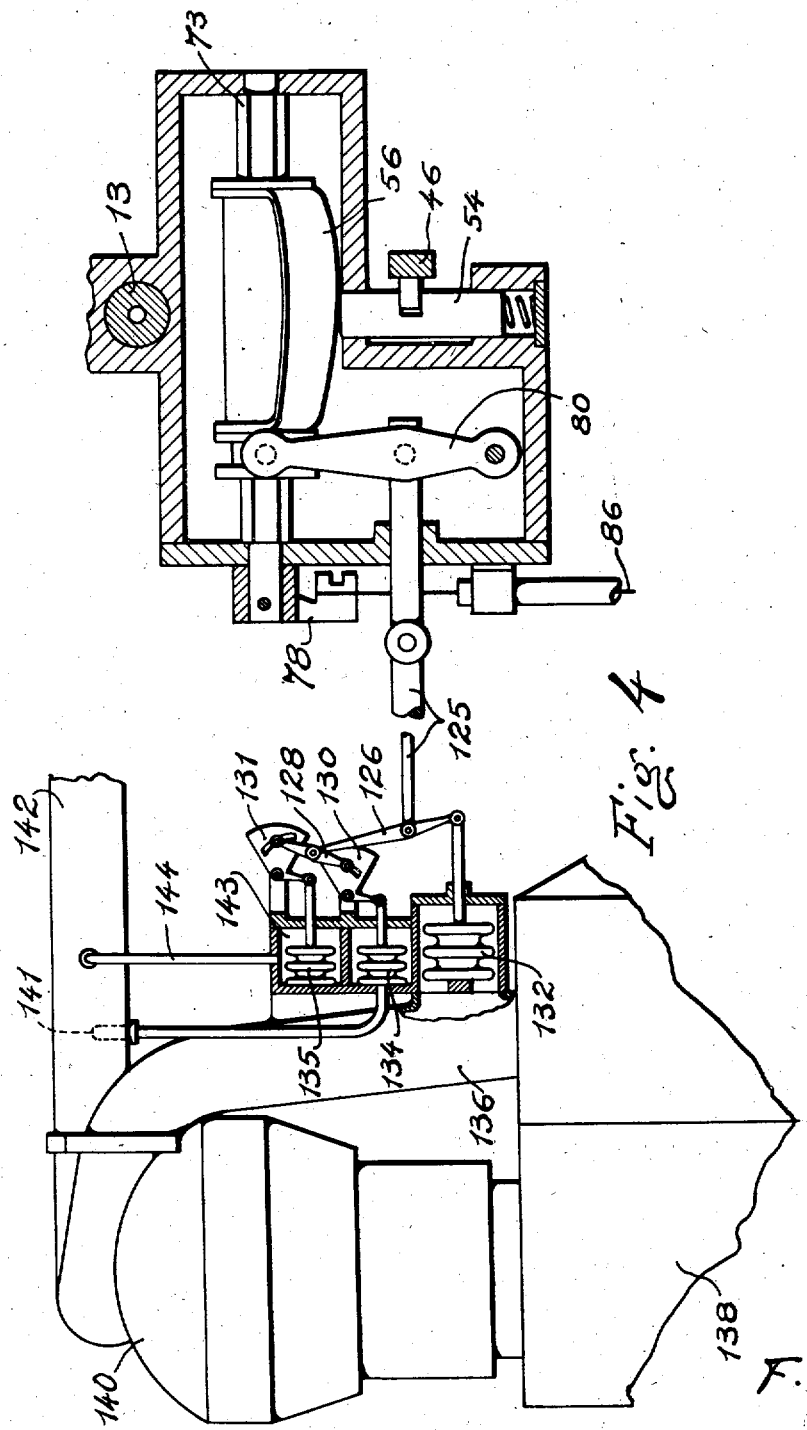
Figure 4 is another sectional view illustrating a further partially modified embodiment of the invention.

A still further partly modified embodiment of the invention is shown in Figure 4, wherein the lever 80 which controls the axial position of the cam 56 relative to the follower 54 is operatively connected by means of linkage 125, floating levers 126 and 128 and cams 130 and 131 with three resilient bellows or capsules 132, 134 and 135. The sealed bellows 132 contains dry air or gas and is responsive to the pressure and temperature within the induction manifold 136 which connects the supercharger of the engine 138 with the cylinder 140 thereof. The bellows 134 is connected with a temperature responsive element 141 mounted on the engine exhaust pipe 142 and is therefore responsive to the exhaust temperature, while the evacuated bellows 135 is enclosed within a housing 143 which is connected by means of a conduit 144 with the exhaust pipe 142, and is responsive to the exhaust pressure. This arrangement is particularly suitable in connection with engines provided with an exhaust-driven turbo supercharger (which is not shown in the drawings). The linkage represented in Figure 4 connecting the three bellows with the lever 80 is so designed that cam 56 is displaced toward the right upon decrease of manifold pressure, increase of manifold temperature, decrease of exhaust temperature and increase of exhaust pressure. The angular adjustment of cam 56 is dependent upon the engine speed, while the adjustment of the floating lever 46 varies with changes of an engine operative temperature and may be altered manually, as disclosed above in connection with Figures 1, 2 and 3.

It is to be noted that when the exhaust counter-pressure is higher, the combustible charge within the engine cylinder contains a higher percentage of residual exhaust gas, which is known to alter the combustion characteristics of the mixture. Furthermore, for a given air or mixture temperature in the manifold 136, the actual temperature of the charge within the engine cylinder at the end of the compression stroke is dependent upon the exhaust pressure and temperature, as well as upon the cylinder temperature to which the element 67 is subject. It will therefore be appreciated that by means of the above described devices the ignition timing may be automatically regulated more closely than heretofore to the ideal spark setting corresponding to the varying conditions of temperature, pressure, fuel-air ratio, exhaust gas dilution of the combustible charge within the engine cylinder immediately preceding the ignition phase.

These embodiments of the invention have been shown merely for purpose of illustration and not as a limitation of the scope of the invention. It is therefore to be expressly understood that the invention is not limited to the specific embodiments shown, but may be used in various other ways, and that various changes, substitutions, additions and omissions may be made in the construction, arrangement and manner of operation of the parts within the scope or limits of the invention as defined in the following claims. In particular, while the cam 56 has been described as slidable and rotatable, according to the invention it may have two other orders of adjustment, for example it may be slidably adjustable in two different directions. Furthermore, the operative connection between levers 46 and 22 shown in Figure 1 need not be provided, in which case the lever 46 and the various controlling elements which actuate the cam follower 54 and the rod 58 serve to control the ignition timing exclusively and not the fuel-air ratio. The invention may obviously be applied not only to aircraft engines, but also to any other suitable engine, whether supercharged or not.

Where the claims are directed to less than all of the elements of the complete system disclosed, they are intended to cover possible uses of the recited elements in installations which may lack the non-recited elements.

Certain features disclosed herein are claimed in my copending patent application Serial Number 254,355, filed February 3, 1939, and my copending application Serial Number 401,353, filed July 7, 1941.

I claim:

1. Engine ignition device including timing control means, and means responsive to changes of exhaust temperature and manifold pressure to actuate said control means.

2. Engine ignition device including timing control means, and means responsive to changes of manifold pressure and temperature to actuate said control means.

3. Engine ignition device having timing control means, and means for actuating the latter with changes of engine exhaust temperature, manifold pressure and speed.

4. Engine ignition device including timing control means, and means for actuating the latter with changes of engine speed and torque.

5. Engine ignition device including timing control means, and means for actuating the latter with changes of speed, torque and temperature.

6. Engine ignition device having timing control means, and torque and temperature responsive means for actuating said control means.

7. Engine ignition device including timing control means, and manifold temperature responsive means to actuate said control means.

8. Engine ignition timing device including means responsive to cylinder and manifold temperature to control said timing.

9. Engine ignition device having timing control means, and means for actuating said control means with changes of engine speed and manifold temperature.

10. Engine ignition device having timing control means, and manifold pressure and temperature responsive means and exhaust pressure responsive means to actuate said control means.

11. Engine ignition device including timing control means, and means for actuating the latter with variations of engine speed, manifold pressure and exhaust pressure.

12. Engine ignition device having timing control means, and means for actuating the latter with variations of manifold density, exhaust pressure and engine speed.

13. Engine ignition device having timing control means, and manifold pressure, exhaust pressure and exhaust temperature responsive means operatively connected with said control means.

14. In an engine ignition device, timing control means therefor and exhaust temperature responsive means connected therewith.

15. In an engine ignition device, timing control means therefor and means responsive to changes of exhaust pressure and temperature connected therewith.

16. Engine ignition device having timing control means, and means for actuating said control means with changes of engine speed and exhaust pressure.

17. Engine ignition device having timing control means, warped cam means movable in two different ways for actuating said control means, and means for varying the adjustment of said cam means in said two ways with changes of engine operative conditions.

18. Engine ignition device having timing control means, and an axially and angularly adjustable warped cam to actuate said control means.

19. Engine ignition timing control means, fuel-air ratio control means, and means responsive to variations of induction pressure and temperature to actuate said two control means.

20. Engine ignition timing control means, fuel-air ratio control means, and common induction and exhaust pressure responsive means to actuate said two control means.

21. Engine ignition timing control means, fuel-air ratio control means, and means for actuating said two control means with changes of engine speed and induction and exhaust pressures.

22. Engine ignition timing control means, fuel-air ratio control means, and means for actuating said two control means with changes of engine torque and speed.

23. Engine ignition timing control means, fuel-air ratio control means, and means for actuating said two control means in dependence upon engine torque and temperature.

24. Engine fuel-air ratio control means, and means responsive to changes of manifold pressure and temperature and exhaust pressure actuating said control means to vary said fuel-air ratio automatically.

25. Engine fuel-air ratio control means, and means actuating said control means to vary said fuel-air ratio with changes of engine speed, manifold pressure and exhaust pressure.

26. Engine ignition timing control means, fuel-air ratio control means, and means responsive to changes of exhaust temperature connected with said two control means.

27. Engine fuel-air ratio control means, and means responsive to changes of exhaust pressure and temperature actuating said control means to vary said fuel-air ratio.

28. Engine fuel-air ratio control means, ignition timing control means, and means responsive to changes of manifold pressure and temperature and exhaust pressure to actuate said two control means.

29. Supercharged engine fuel-air ratio control means; and manual regulating means and means responsive to changes of induction pressure and temperature between supercharger and engine and exhaust pressure actuating said control means to vary said fuel-air ratio.

30. Supercharged engine fuel control device including venturi means; venturi differential pressure and venturi air pressure and temperature responsive means to keep the engine fuel supply proportional to the engine air supply; mixture control means to regulate the proportionality ratio between said fuel and air supplies; and means responsive to changes of induction pressure and temperature between supercharger and engine and exhaust pressure to actuate said mixture control means.

31. Supercharged engine fuel control system including a venturi device having pressure and temperature responsive means upstream of the supercharger to keep the engine fuel supply substantially proportional to the engine air supply; fuel-air mixture ratio control means regulating the ratio of proportionality between said fuel and air supplies; and means to actuate said ratio control means with changes of engine speed, exhaust pressure and induction pressure between supercharger and engine.

32. Engine fuel-air ratio control means; and means actuating said control means to vary said fuel-air ratio with changes of engine speed, manifold pressure, exhaust pressure and an operative temperature.

33. Supercharged engine fuel-air ratio control means; and manual control means and means responsive to changes of engine speed, induction pressure between supercharger and engine, and exhaust pressure operatively connected with said ratio control means to alter said fuel-air ratio.

34. Engine fuel-air ratio control means, and manual regulating means and means responsive to changes of exhaust pressure and temperature actuating said control means to alter said ratio.

35. Charge forming device including venturi means to keep the engine fuel supply substantially proportional to the engine air supply; mixture control means regulating the ratio of proportionality between said fuel and air supplies; and means responsive to changes of exhaust pressure and temperature operatively connected with said mixture control means to alter said mixture ratio automatically.

FERDINANDO CARLO REGGIO.

DISCLAIMER 2,378,037.—*Ferdinando Carlo Reggio*, Buffalo, N. Y. ENGINE REGULATING MEANS. Patent dated June 12, 1945. Disclaimer filed Nov. 19, 1945, by the inventor.

Hereby disclaims from the scope of claims 24, 27, 29 and 34 of said specification any engine fuel-air ratio control means except such as include Venturi means and Venturi differential pressure responsive means; and disclaims from the scope of claim 35 of said specification any Venturi means except such as include Venturi differential pressure responsive means.

[*Official Gazette January 1, 1946.*]

including venturi means; venturi differential pressure and venturi air pressure and temperature responsive means to keep the engine fuel supply proportional to the engine air supply; mixture control means to regulate the proportionality ratio between said fuel and air supplies; and means responsive to changes of induction pressure and temperature between supercharger and engine and exhaust pressure to actuate said mixture control means.

31. Supercharged engine fuel control system including a venturi device having pressure and temperature responsive means upstream of the supercharger to keep the engine fuel supply substantially proportional to the engine air supply; fuel-air mixture ratio control means regulating the ratio of proportionality between said fuel and air supplies; and means to actuate said ratio control means with changes of engine speed, exhaust pressure and induction pressure between supercharger and engine.

32. Engine fuel-air ratio control means; and means actuating said control means to vary said fuel-air ratio with changes of engine speed, manifold pressure, exhaust pressure and an operative temperature.

33. Supercharged engine fuel-air ratio control means; and manual control means and means responsive to changes of engine speed, induction pressure between supercharger and engine, and exhaust pressure operatively connected with said ratio control means to alter said fuel-air ratio.

34. Engine fuel-air ratio control means, and manual regulating means and means responsive to changes of exhaust pressure and temperature actuating said control means to alter said ratio.

35. Charge forming device including venturi means to keep the engine fuel supply substantially proportional to the engine air supply; mixture control means regulating the ratio of proportionality between said fuel and air supplies; and means responsive to changes of exhaust pressure and temperature operatively connected with said mixture control means to alter said mixture ratio automatically.

FERDINANDO CARLO REGGIO.

DISCLAIMER 2,378,037.—*Ferdinando Carlo Reggio*, Buffalo, N. Y. ENGINE REGULATING MEANS. Patent dated June 12, 1945. Disclaimer filed Nov. 19, 1945, by the inventor.

Hereby disclaims from the scope of claims 24, 27, 29 and 34 of said specification any engine fuel-air ratio control means except such as include Venturi means and Venturi differential pressure responsive means; and disclaims from the scope of claim 35 of said specification any Venturi means except such as include Venturi differential pressure responsive means.

[*Official Gazette January 1, 1946.*]